United States Patent
Abboa-Offei et al.

(10) Patent No.: US 9,154,845 B1
(45) Date of Patent: Oct. 6, 2015

(54) ENABLING COMMUNICATION AND CONTENT VIEWING

(71) Applicant: WEW Entertainment Corporation, Brooklyn, NY (US)

(72) Inventors: Kwabena Benoni Abboa-Offei, Brooklyn, NY (US); Maurice Courtois, Basel (CH)

(73) Assignee: WEW Entertainment Corporation, Brooklyn, NY (US)

( * ) Notice: Subject to any disclaimer, the term of this patent is extended or adjusted under 35 U.S.C. 154(b) by 0 days.

(21) Appl. No.: 14/339,695

(22) Filed: Jul. 24, 2014

Related U.S. Application Data

(60) Provisional application No. 61/859,428, filed on Jul. 29, 2013.

(51) Int. Cl.
| | |
|---|---|
| *H04N 5/445* | (2011.01) |
| *H04N 21/4788* | (2011.01) |
| *H04N 21/431* | (2011.01) |
| *H04N 21/482* | (2011.01) |
| *H04N 21/8545* | (2011.01) |

(52) U.S. Cl.
CPC ....... *H04N 21/4788* (2013.01); *H04N 21/4316* (2013.01); *H04N 21/482* (2013.01); *H04N 21/8545* (2013.01)

(58) Field of Classification Search
CPC .................... H04N 21/4886; H04N 21/25825
USPC ........................................ 725/40, 47, 37, 136
See application file for complete search history.

(56) References Cited

U.S. PATENT DOCUMENTS

| | | | |
|---|---|---|---|
| 5,995,096 A * | 11/1999 | Kitahara et al. | 715/753 |
| 6,954,498 B1 | 10/2005 | Lipton | |
| 7,627,831 B2 * | 12/2009 | Chiu et al. | 715/767 |
| 2005/0229233 A1 | 10/2005 | Zimmerman et al. | |
| 2006/0173838 A1 | 8/2006 | Garg et al. | |
| 2007/0240180 A1 | 10/2007 | Shanks et al. | |
| 2008/0059580 A1 | 3/2008 | Kalinowski et al. | |
| 2008/0059986 A1 | 3/2008 | Kalinowski et al. | |
| 2008/0104536 A1 * | 5/2008 | Mori | 715/798 |
| 2008/0247650 A1 | 10/2008 | Amir et al. | |
| 2008/0250450 A1 | 10/2008 | Larner et al. | |
| 2009/0064101 A1 * | 3/2009 | Boss et al. | 717/113 |

(Continued)

OTHER PUBLICATIONS

Compact disc (CD) containing video clip showing drag and drop features of Tesla touchscreen display retrieved on Feb. 5, 2015. (Being submitted by Express Mail to Patent Office on Jun. 10, 2015).

(Continued)

*Primary Examiner* — Pankaj Kumar
*Assistant Examiner* — Sahar Baig
(74) *Attorney, Agent, or Firm* — Fish & Richardson P.C.

(57) ABSTRACT

An example system includes: storing, in a data object, data corresponding to electronic communication, where the data object has an object element associated therewith, and the object element initially resides on a first area of a portal; recognizing movement of the object element from the first location to a second location on the portal, where the second location is different from the first location; detecting that the object element has been moved to the second location; in response to the detecting, triggering execution of a function to obtain the data from the data object; and generating a display of the electronic communication based on the data, where the display is rendered over at least part of the second location.

20 Claims, 10 Drawing Sheets

(56) References Cited

U.S. PATENT DOCUMENTS

| | | |
|---|---|---|
| 2009/0116702 A1 | 5/2009 | Conradt et al. |
| 2009/0150939 A1 | 6/2009 | Drucker et al. |
| 2009/0326953 A1* | 12/2009 | Peralta Gimenez et al. ............ 704/270.1 |
| 2010/0058220 A1* | 3/2010 | Carpenter ..................... 715/772 |
| 2010/0088623 A1* | 4/2010 | Ichino ........................... 715/766 |
| 2010/0329633 A1 | 12/2010 | Lafond et al. |
| 2011/0289422 A1 | 11/2011 | Spivack et al. |
| 2012/0023534 A1 | 1/2012 | Dasilva et al. |
| 2012/0033950 A1 | 2/2012 | Cordray |
| 2012/0059825 A1 | 3/2012 | Fishman et al. |
| 2012/0124620 A1 | 5/2012 | Nishizawa et al. |
| 2012/0213490 A1 | 8/2012 | Steiner |
| 2012/0254917 A1 | 10/2012 | Burkitt et al. |
| 2012/0290508 A1 | 11/2012 | Bist |
| 2012/0311032 A1 | 12/2012 | Murphy et al. |
| 2012/0323908 A1 | 12/2012 | Herbert et al. |
| 2013/0007792 A1 | 1/2013 | Jeon et al. |
| 2013/0074109 A1 | 3/2013 | Skelton et al. |
| 2013/0191765 A1* | 7/2013 | Andersson Reimer et al. ................ 715/762 |
| 2014/0013353 A1 | 1/2014 | Mathur |
| 2014/0089423 A1 | 3/2014 | Jackels |
| 2014/0222462 A1* | 8/2014 | Shakil et al. ...................... 705/3 |

OTHER PUBLICATIONS

Screen capture of images from video clip showing drag and drop features of Tesla touchscreen display (one page) (captured Jun. 9, 2015) Note: A CD with the live video taken on Dec. 5, 2014 will be submitted with the Patent Office on Jun. 10, 2015.

Tesla Model S Owner's Manual (145 pages) (© 2012-2013).

Tesla Model S: A Quick Guide for Owners (36 pages) (2012).

USPTO Final Office in U.S. Appl. No. 14/339,694, mailed May 13, 2015 (23 pages).

\* cited by examiner

ENABLING COMMUNICATION AND CONTENT VIEWING

CLAIM TO PRIORITY

Priority is hereby claimed to U.S. Provisional Application No. 61/859,428, which was filed on Jul. 29, 2013. The contents of U.S. Provisional Application No. 61/859,428 are incorporated herein by reference.

TECHNICAL FIELD

This specification relates generally to enabling communication and content viewing.

BACKGROUND

Audio-video content, such as television programs or movies, may be viewed on a variety of devices including, but not limited to, smartphones, tablets, smart televisions, and computers. Connections to the Internet, or other network(s), allow user of such devices access to program-related content from other network users.

SUMMARY

This specification describes systems, methods and apparatus, including computer program products, for enabling communication and content viewing.

An example system performs the following operations: storing, in a data object, data corresponding to electronic communication, where the data object has an object element associated therewith, and where the object element initially resides on a first area of a portal; recognizing movement of the object element from the first location to a second location on the portal, where the second location is different from the first location; detecting that the object element has been moved to the second location; in response to the detecting, triggering execution of a function to obtain the data from the data object; and generating a display of the electronic communication based on the data, where the display is rendered over at least part of the second location. The example system may include one or more of the following features, either alone or in combination.

The data may comprise a serialized representation of the electronic communication, and the function to obtain the data may comprise a process for deserializing the data. The data may comprise one or more pointers to information about the electronic communication, and the function to obtain the data may comprise using the pointer to retrieve the data.

The system may perform the following operations: storing the data object in a temporary object in response to recognizing that the object element moved from the first location; and redrawing a part of the first area that contained the object element to reflect movement of the object element from the first area.

The display of the electronic communication may be generated in response to detecting release of the object element at the second location. The system may generate a shadow display in response to detecting that the object element is over the second location but has not been released over the second location, where the shadow display is generated based on at least some of the data.

The system may perform the following operations: recognizing movement of the object element from the second location to the first location on the portal; detecting that the object element has been moved to the second location; in response to the detecting, triggering execution of a function to store data for the electronic communication in a data object associated with the object element at the second location; and generating a display of the electronic communication based on the data, where the display is rendered over at least part of the first location.

The system may perform the following operations prior to detecting that the object element has been moved to the second location: detecting that the object element has been released prior to reaching the second location; sending the data object to a process associated with the first location; and executing the process at the first location to redraw the object element at the first location and to store the data object in the first location in association with the object element.

The data may comprise an encrypted representation of the electronic communication and the function to obtain the data may comprise a process for decrypting the data. The electronic communication may be a chat session for a user of a multimedia application. The multimedia application may be for displaying audio-video content associated with the chat session either on the portal or on a second portal. The data object may store data representing content other than the electronic communication, where the display includes the content other than the electronic communication.

In some aspects, the example systems described herein enable: (1) embedding data into data objects associated with object elements contained in a first sub-view, where that data is in a format that can be decompressed by dragging-and-dropping or moving object element(s) into a second sub-view, and where the second sub-view is associated with data-decompression code, (2) user(s) to interact with various fields of decompressed data, where fields of data are associated with multiple users and the object elements are inside of the second sub-view, and (3) moving the object element(s) back to the first sub-view for recompression.

Any two or more of the features described in this specification, including in this summary section, may be combined to form embodiments not specifically described in this patent application.

All or part of the systems and techniques described herein may be implemented as a computer program product that includes instructions that are stored on one or more non-transitory machine-readable storage media, and that are executable on one or more processing devices. Examples of non-transitory machine-readable storage media include e.g., read-only memory, an optical disk drive, memory disk drive, random access memory, and the like. All or part of the systems and techniques described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF THE DRAWINGS

Like reference numerals in different figures indicate like elements.

DETAILED DESCRIPTION

Described herein are example processes for enabling communication and content viewing. The example processes enable a user to view content, such as a television broadcast, while also viewing electronic communications, such as chat sessions, associated with that content. Data representing the electronic communications may be stored in a data object in association with an object element, such as a profile picture, on a portal. That object element may be moved from one location to another location on the portal. That other location is associated with executable code that may be triggered by executable code associated with the data object/object element. Thus, in the example processes, movement of the object element to the other location triggers execution of code to enable display of the electronic communications at the other location (coincident with display of the content for viewing). The user may further control movement of the object element, as described herein, to control display of the electronic communications.

The example techniques described herein may be used in any appropriate context, and are not limited to use with any particular system. An example system in which the techniques described herein may be used is presented below.

Figure 1:
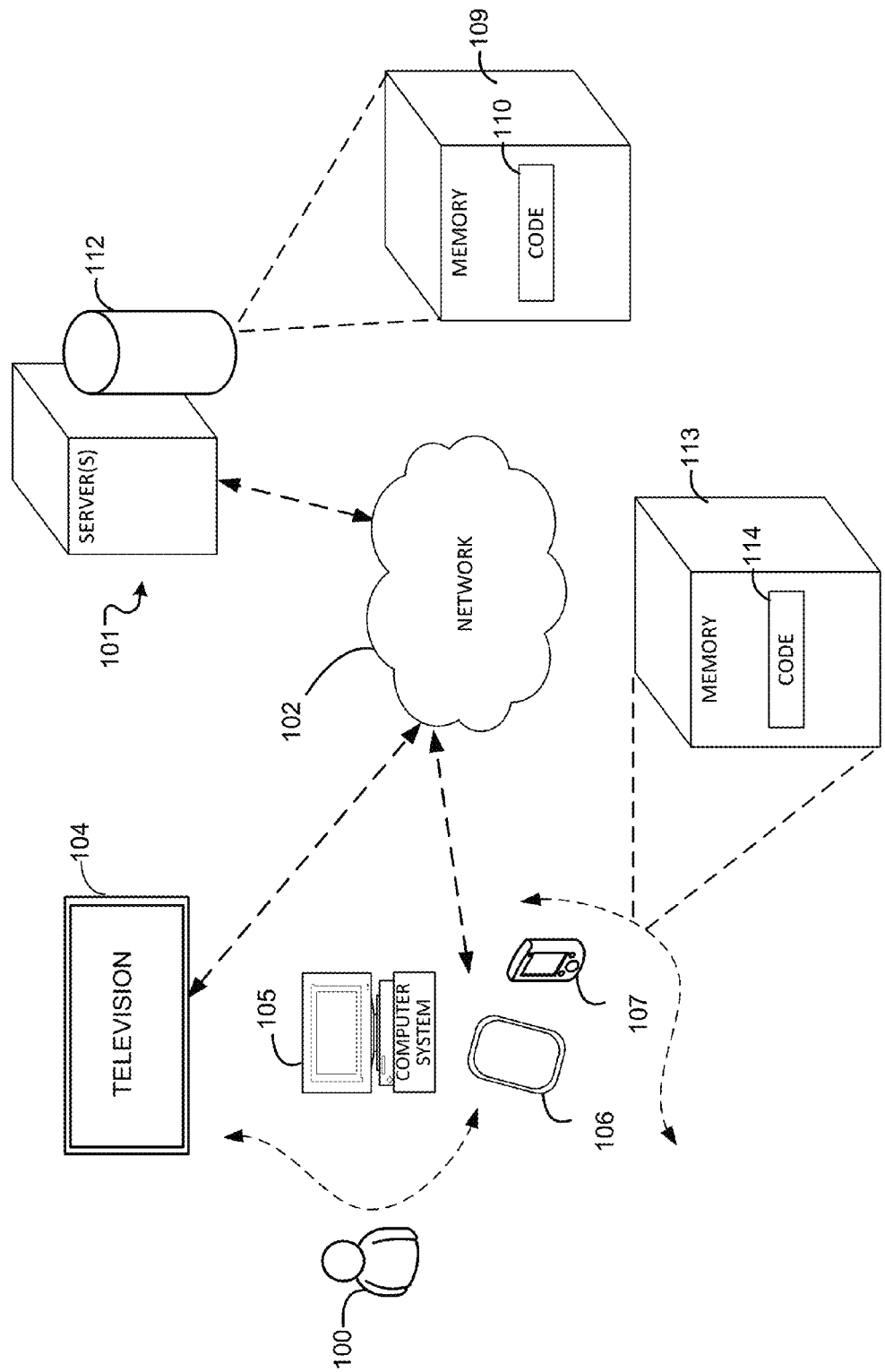
FIG. 1 is a block diagram of an example system on which processes enabling communication and content viewing may be implemented.

Referring to FIG. 1, the example system includes an interactive electronic program guide (e.g., FIG. 2) that is controllable by a user 100. The example system may be implemented in a multimedia application that includes a dynamic communications interface (e.g., FIG. 5). The dynamic communications interface enables and encourages users of the system to interact and, in some cases, to view the reactions of others, while watching content, such as broadcast television. The interface, which may be a Web page or other type of portal, may provide users with the opportunity to view the profile information of people who are watching content at a given time, and to select users for a chat experience. The profile information may be input to the system or downloaded from external social media platform(s).

The example system may be hosted by one or more servers (server) 101, which are accessible over a network 102, such as the Internet, either over wired or wireless connection(s). For example, user 100 may access a Web site hosted by the one or more servers to obtain access to the example system. User 100 may access the system through any one or more user devices, such as television 104, computer 105, portable device 106, smartphone 107, etc. The Web site may be generated by one or more processing devices in the server executing code 110 stored in memory 109 of server 101. The Web site operations may be controlled by server 101 alone or in conjunction with executable code 114 that is stored in memory 113 on, and executed by one or more processing devices of, a user device.

Figure 2:
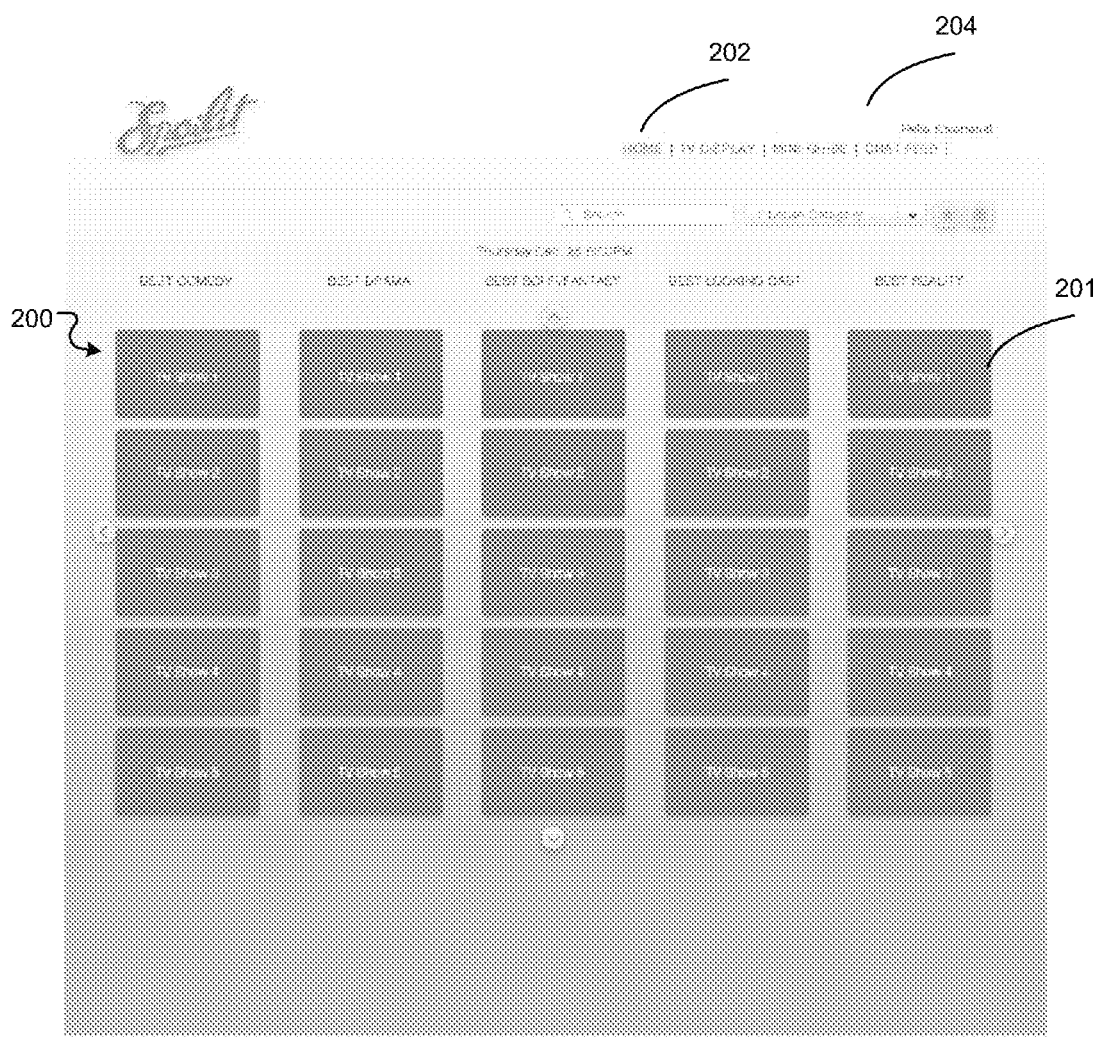
FIG. 2 is a block diagram of an example electronic program guide.

In an example implementation, upon accessing the system, the user may be presented with an electronic program guide, such as guide 200 shown in FIG. 2. The user may select guide 200 by selecting "HOME" menu option 202 from menu 204. Guide 200 may contain audio-video content (e.g., television programs, movies, and the like) that the user may access via their device (e.g., computer, tablet, smartphone, smart television, or the like). The content may be all content available to that user (e.g., through a subscription service) or content that is trending on social media or on the system itself. The user may select a program 201 to view by clicking-on, touching, or otherwise identifying that program. In some implementations, the system enables a two-screen experience and in some implementations, the system enables a one-screen experience. The user may configure the system for a one-screen or two-screen experience. In an example two-screen experience, the selected program is viewed on one screen (e.g., on television 104's screen) and related content (described below) is viewed on a second screen (e.g., computer 105's screen). In an example one-screen experience, the selected program and related content are both viewed on the same portal on the same screen (e.g., on the screen of computer 105 or television 104).

In an example one-screen experience, the user selects a program 201 from guide 200. In response, the system automatically (e.g., without user intervention) obtains content for the program 200, and identifies other users registered with the system who are currently viewing that program. The system generates data for a portal, such as Web page 300 of FIG. 3. As in the case with the other screen-shots shown herein, user settings may dictate portal display and functionality. In this example, the user may configure, and display, the portal of Web page 300 by selecting "TV DISPLAY" menu option 303 from menu 204.

In this example implementation, Web page 300 includes a display area 301 for viewing the program and sub-views 302 corresponding to users logged into the system who are currently viewing the same program. Sub-views 302 are associated with data objects corresponding to other users logged into (or registered with) the system who are currently viewing the same program. In some implementation, sub-views 302 may constitute a single sub-view area. In this example, each data object is represented by a user's profile picture. The representation of a data object is referred to as an object element. In some implementations, each object element may be a current video of the user (e.g., from a Web camera) or some non-static object element. In this regard, examples of representations of data objects, namely, object elements, include, but are not limited to the following: pictures, text, images, banners, graphics, sounds files, and videos. Examples of sub-views include, but are not limited to, a portion of an overall view on a display screen, or a defined section of a viewable display screen, which may hold content.

Figure 3:
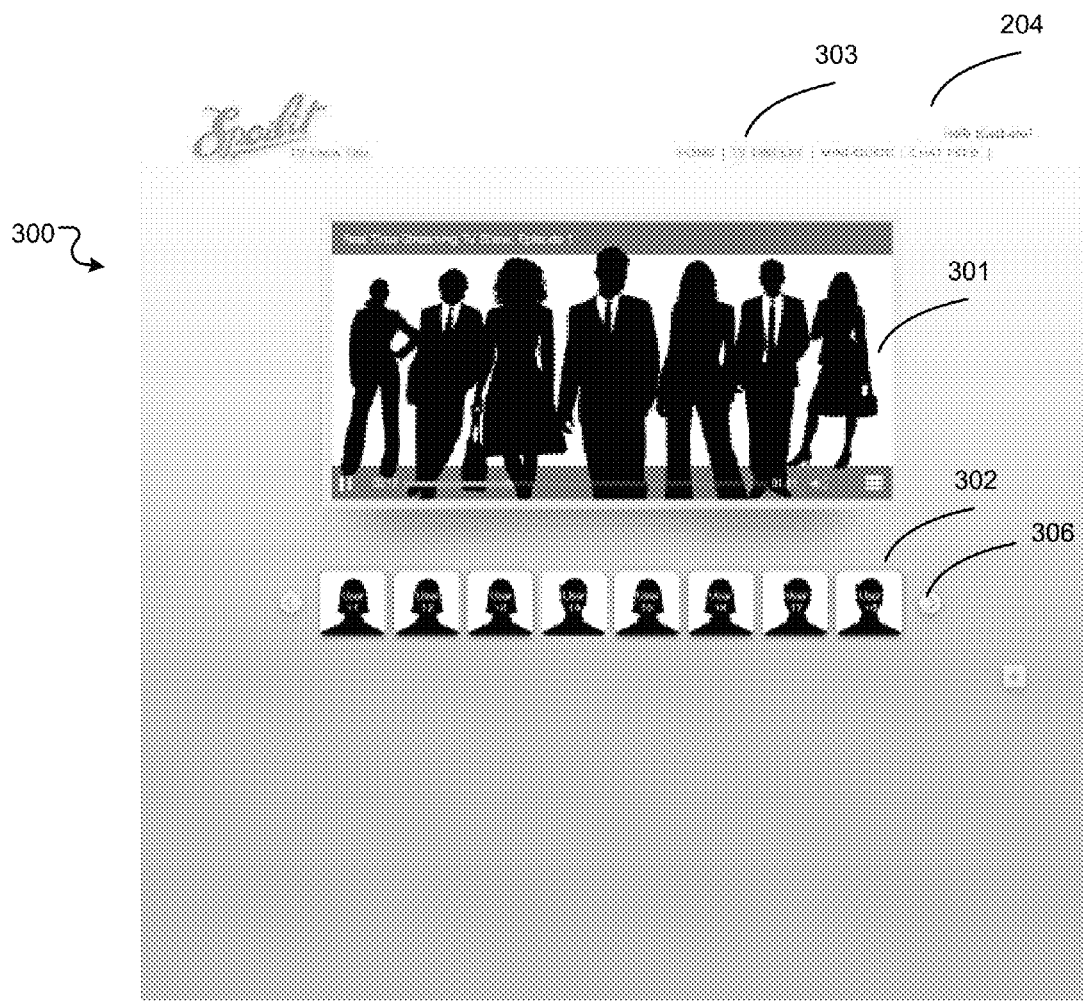
FIG. 3 is a block diagram of an example page for viewing audio-video content and for selecting one or more users for chat.

Thus, in the example implementation of FIG. 3, there is a menu, and a display or list of one or more various object elements (e.g., photographs, text, banners etc.). The menu display or list in this example contains scroll-bar functionality 306.

Figure 4:
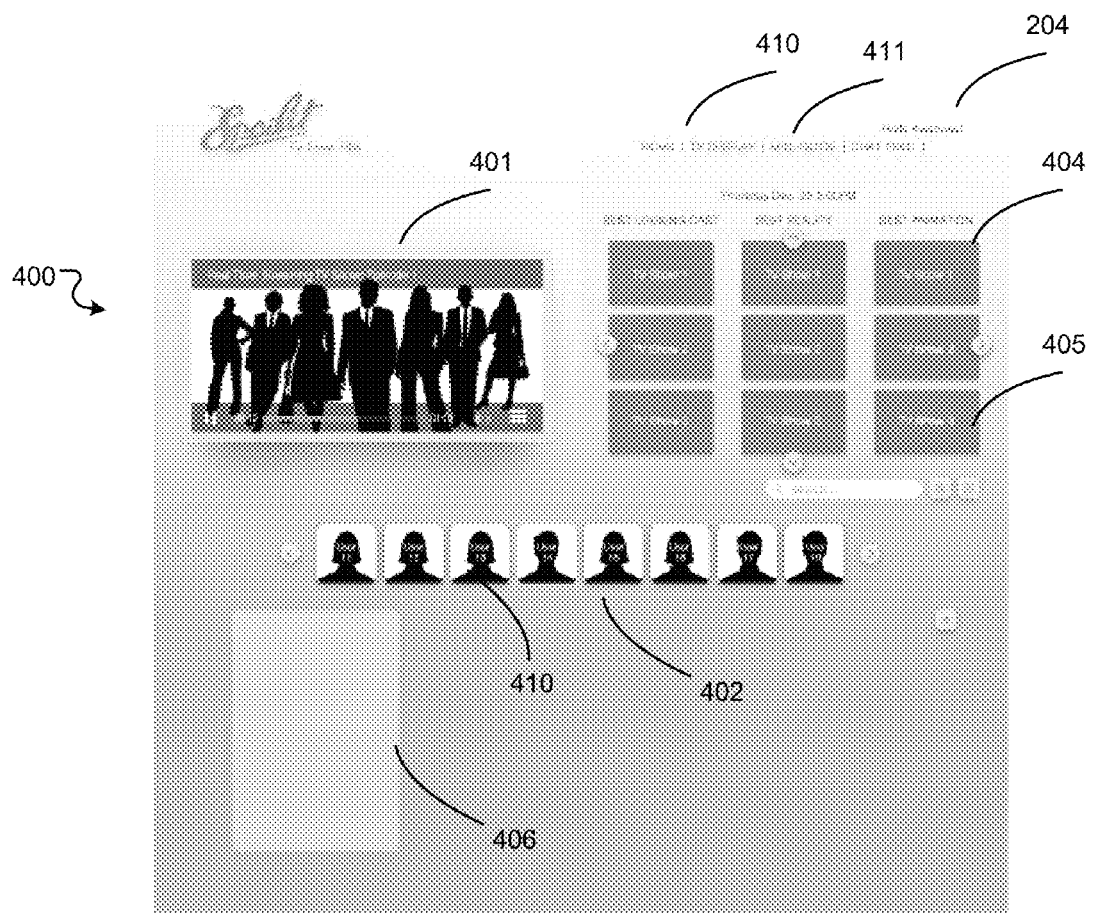
FIG. 4 is a block diagram of an example page for viewing audio-video content, which shows a sub-view area to which a profile picture may be moved.

FIG. 4 shows another example portal, e.g., Web page 400, configured to implement a one-screen viewing experience. In example Web page 400, display area 401 presents the selected program and sub-views 402 correspond to data objects (represented by object elements, which are profile pictures in this example) associated with users logged into the system who are currently viewing the same program (e.g., the program presented in display area 401). Web page 401 includes a selectable menu 404 (in this example implementation, a "mini" program guide) for selecting other programs 405 for viewing. Web page 400 also includes sub-view area 406, which enables interaction between users, as described below. The user may configure, and display, the portal of Web page 400 by selecting "TV DISPLAY" menu option 410 and "MINI-GUIDE" menu option 411 from menu 204.

In some implementations, each data object contains (e.g., stores) data relating to the user represented by a corresponding object element. For example, a data object for object element 410 may contain profile information for the user (e.g., name, age, likes, dislikes, etc.), and data representing, or data representing a link to, one or more chats or other electronic communications in which the user is participating, has participated, has some interest, and so forth. In some implementations, each user may participate in one or more online chat sessions with other users of the system or with other systems. Those chat sessions may be about the program presented in display area 401, or may be initiated in response to viewing the program followed by some user interaction.

In some implementations, data may be embedded and compressed (e.g., serialized) within each data object. For example, in some implementations, the actual data representing a chat session may be stored within a data object. In some implementations, pointers to data may be embedded in and compressed within each data object. For example, pointer(s) to data representing a chat session or other type of information may be stored within a data object. In some implementations, a data object may contain a combination of embedded and compressed data and pointers. To view some, or all, of the information corresponding to that data, a user may drag-and-drop an object element (and thus also a data object associated with the object element) into a sub-view area 406. Dragging-and-dropping the object element also causes the data object to be dragged-and-dropped. In this example implementation, sub-view area 406 is a pre-defined area of the Web page (or other type of portal) having the functionality described below.

In some implementations, each data object (and thus object element) in a sub-view 402 may be associated with one or more data tags or data elements, which may be hidden from view, yet embedded, compressed (e.g., serialized), or referenced within each corresponding data object for later retrieval, expansion, manipulation or other appropriate functions. This first sub-view area functions to keep embedded-data elements hidden from view or compressed within the data object as result of a dynamic interaction between event coding associated with the first sub-view area and event coding associated with the data object/object element. As such, this first sub-view area may also be referred to as "the compression space". In some implementations, event coding may include, but is not limited to, computer-executable code associated with a data object/object element or sub-view, the operation of which may be triggered by on-screen interaction of an object element and sub-view, as described herein.

In some implementations, sub-view area 406 is referred to as a "hot space" because it is located on the user's viewable screen and serves as an electronic key, decompression space, or decompression event that is usable to decompress, unlock (e.g., deserialize), extract, and/or dynamically expand compressed, embedded and/or hidden data in the data object represented by the corresponding object element. In an example implementation, the user drags-and-drops, or clicks, an object element or elements for a corresponding data object(s) (e.g., the user's profile picture, in this example) into the hot space on the display. In response, event-trigger code associated with the data object/object element interacts with event-trigger code associated with the hot space, and this interaction causes expansion of, and display of, information contained in, or referenced by, data tags associated with the data object. Thus, in some implementations, the hot spaces trigger a new view of data when the event trigger code associated with a moved data object/object element(s) and event trigger code associated with the hot space(s) execute in response to interaction of the object element and the hot space (e.g., sub-view).

Figure 5:
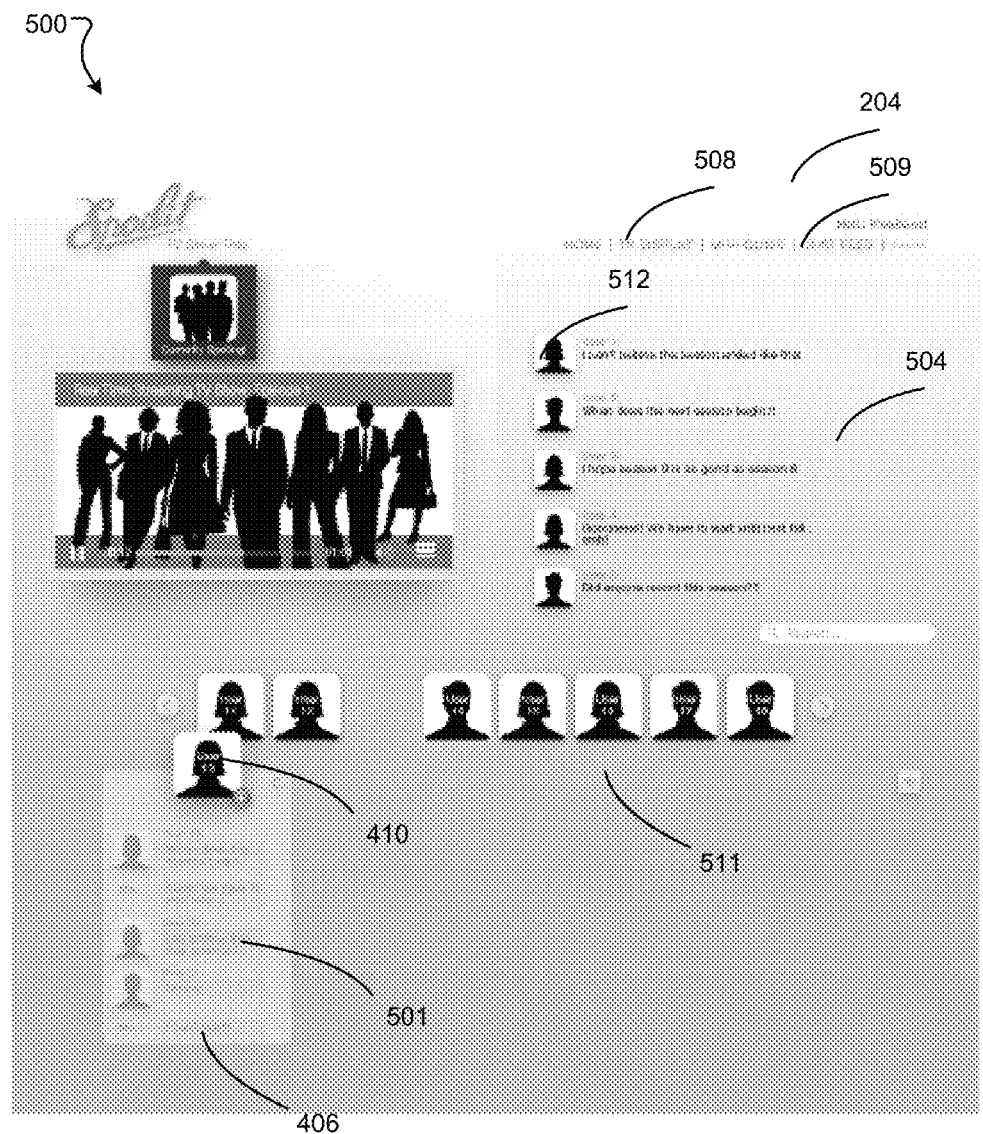
FIG. 5 is a block diagram of an example page for viewing audio-video content, which shows movement of a profile picture to the sub-view area.
Figure 6:
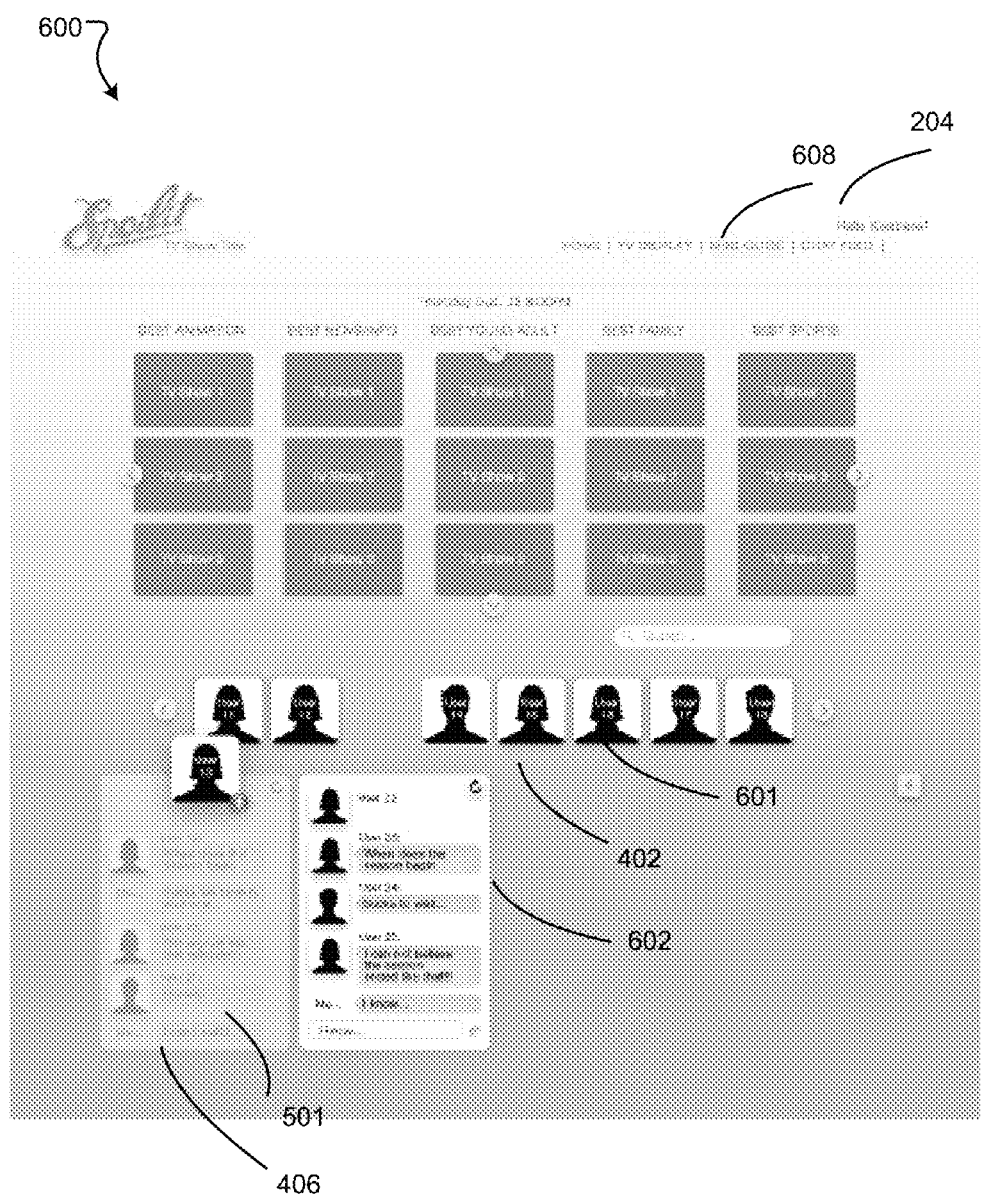
FIG. 6 is a block diagram of an example page for viewing audio-video content, which shows multiple chats in the context of a two-screen experience.

Examples of the foregoing operation are illustrated in FIGS. 5 to 9. In FIG. 5, the user may configure, and display, the portal of Web page 500 by selecting "TV DISPLAY" menu option 508 and "CHAT FEED" menu option 509 from menu 204 (to also display a chat area 504). In FIG. 6, the user may configure, and display, the portal of Web page 600 by selecting "MINI-GUIDE" menu option 608 from menu 204.

Referring to FIG. 5, dragging-and-data object element (e.g., a profile picture) 410, results in expansion and display of data representing a chat session 501 of the corresponding user with one or more other users. In the example of FIG. 5, the user has not yet "dropped" the profile picture and, as a result, the chat session 501 is displayed in shadow form. In this example, event trigger code associated with the data object for object element 410 and sub-view area 406 is able to determine when an object element passes over the sub-view without dropping, in which case data is expanded (e.g., deserialized) and a shadow view is rendered and when the object is dropped, in which case there is a full resolution rendering in the sub-view.

Also, in Web page 500 of FIG. 5, additional interactions have occurred relative to Web page 400 of FIG. 4 to replace menu 404 with a chat area 504. Chat area 504 may represent chat from all users on the system or from a subset of users on the system selected, e.g., by geography or other criteria. Users for chat area 504 may be filtered by selecting appropriate system settings.

A user may drag-and-drop a profile picture (e.g., 410) into chat area 504. In this example implementation, this action causes executable code associated with the data object and corresponding object element to interact with trigger code associated with chat area 504, resulting in a chat session associated with the profile picture expanding, and being presented as part of, chat area 504. This functionality may be implemented in the same manner as the functionality that results in display of a chat card in sub-view area 406 as described below. Furthermore, in some implementations, a profile picture (e.g., picture 512) may have associated therewith data object(s) and functionality of the type associated with profile pictures 511. Accordingly, dragging and dropping such a picture (e.g., picture 512) to sub-view area 406 will result in display of a chat session associated with the user of that picture in sub-view area 406. This functionality may be implemented in the same manner as the functionality that results in display of chat session 501, 602, described below.

FIG. 6 shows a portal, e.g., Web page 600, which may be implemented in a two-screen implementation of the example system. That is, the viewable program is not displayed on the same screen as representations of user objects 601, but rather is displayed on a second screen (e.g., a television screen, which is not shown). In the example of FIG. 6, as is also the case with the one-screen implementation, there may be different chat session 501, 602 displayed for different users. In some implementations, profile information for the users may be displayed. In this regard, in some implementations, when the user "drops" a profile picture in the sub-view, a chat session 602 is displayed in full resolution.

Dragging a representation of the user data object (e.g., 410) from sub-view area 406 back to sub-view area 402 causes the information in the data object to be removed from sub-view area 406. The information contained therein may be re-compressed and embedded into the object for later viewing, if desired. Thus, object elements may be moved from a hot space sub-view (e.g., sub-view area 406) back to a decompression space sub-view (e.g., sub-view 402), where a given set of data elements will again become hidden, embedded, and/or compressed. In some implementations, data for a corresponding data object is updated, reserialized, and re-drawn in the sub-view area 402, as described in more detail below. Hiding, embedding and/or compressing may be caused by execution of code associated with the two sub-views in response to on-screen interaction thereof.

Figure 7:
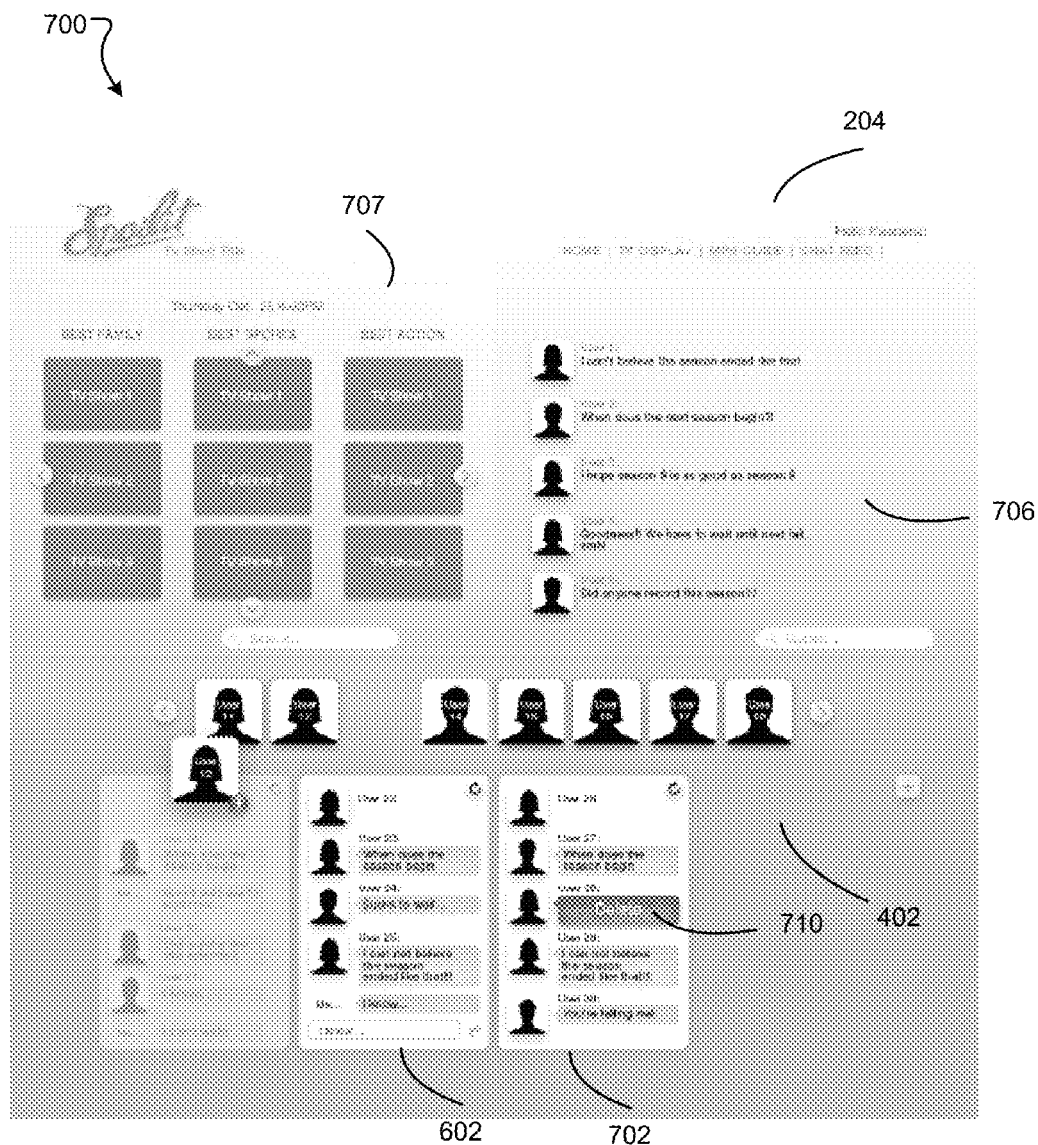
FIG. 7 is a block diagram of an example page for viewing audio-video content, which shows multiple chats and a program guide in the context of a two-screen experience.

FIG. 7 shows a portal, e.g., Web page 700 that may be implemented in a two-screen implementation of the example system. That is, the viewable program is not displayed on the same screen as representations of user objects in area 402, but rather is displayed on a second screen (e.g., a television screen, which is not shown). In the example of FIG. 7, as is also the case with the one-screen implementation, there may be more than one chat session 602,702 displayed for different respective users. In this example, user chat is displayed in area 706 and the electronic program guide (a mini-guide) is displayed in area 707. In this example, as shown at option 710, a user may delete a chat session. In this regard, in some implementations, individual chat session displays (e.g., 602, 702) are referred to as "chat cards" and a set of chat cards is referred to as a "chat deck". The user may configure, and display, the portal of Web page 700 by selecting the "MINI-GUIDE" menu option (to also display a mini-guide 707) and "CHAT FEED" menu option from menu 204 (to also display a chat feed 706).

Figure 8:
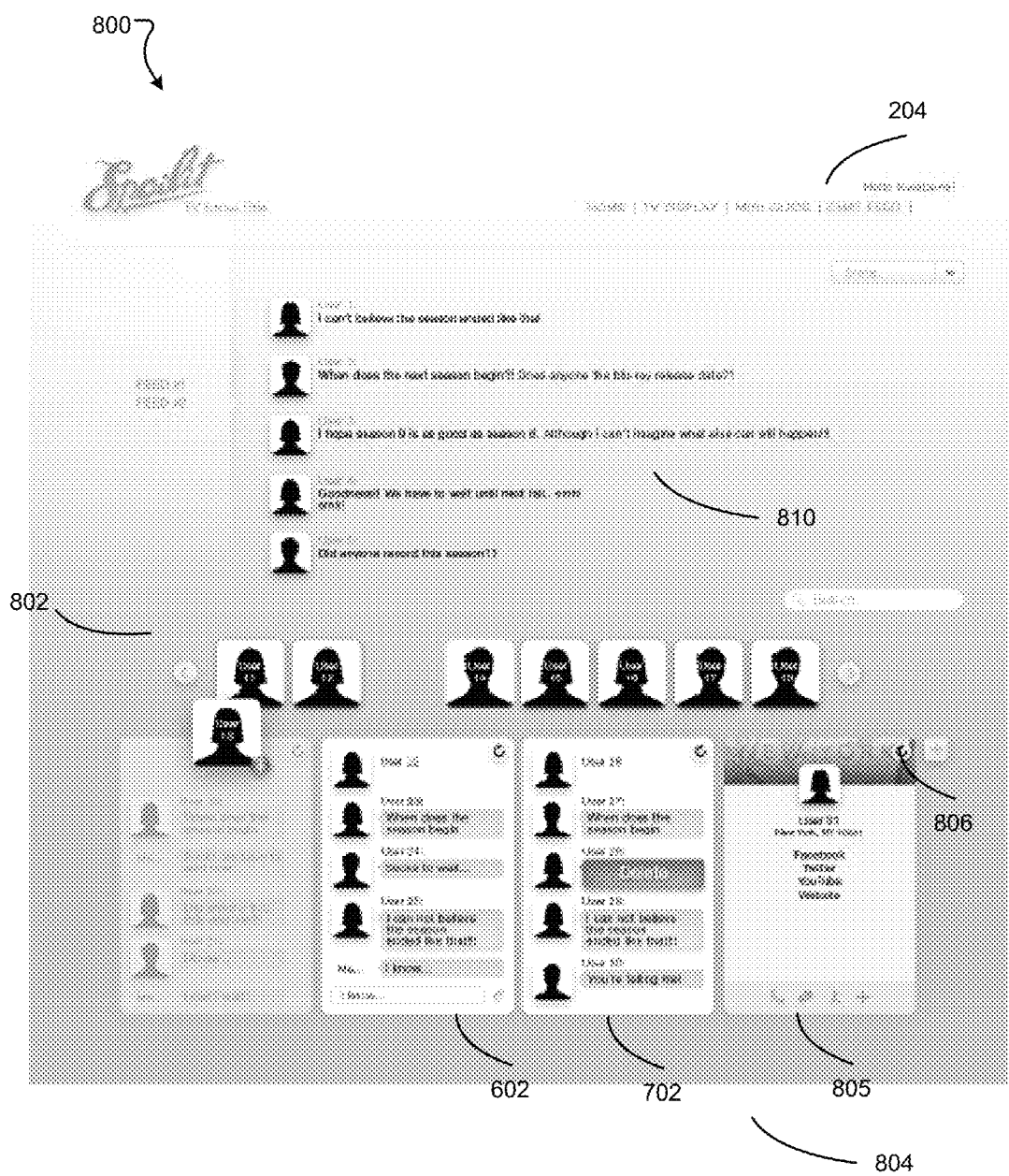
FIG. 8 is a block diagram of an example page for viewing audio-video content, which shows multiple chats and chat feeds in the context of a two-screen experience.

FIG. 8 shows a portal, e.g., Web page 800 that may be implemented in a two-screen implementation of the example system. That is, the viewable program is not displayed on the same screen as representations (object elements) 802 of user objects, but rather is displayed on a second screen (e.g., a television screen, which is not shown). In the example of FIG. 8, four chat cards 804 are shown. In some implementations, a chat card may be "flipped" to display information other than a chat session. For example, in FIG. 8, chat card 805 is flipped (e.g., by clicking on control 806) to display information from the user's profile, here the name and location of the user, along with a list of social networks where the user has accounts. Web page 800 also includes a chat feed 810 relating to a program that users are viewing. The user may configure, and display, the portal of Web page 500 by selecting the "CHAT FEED" menu option from menu 204.

Figure 9:
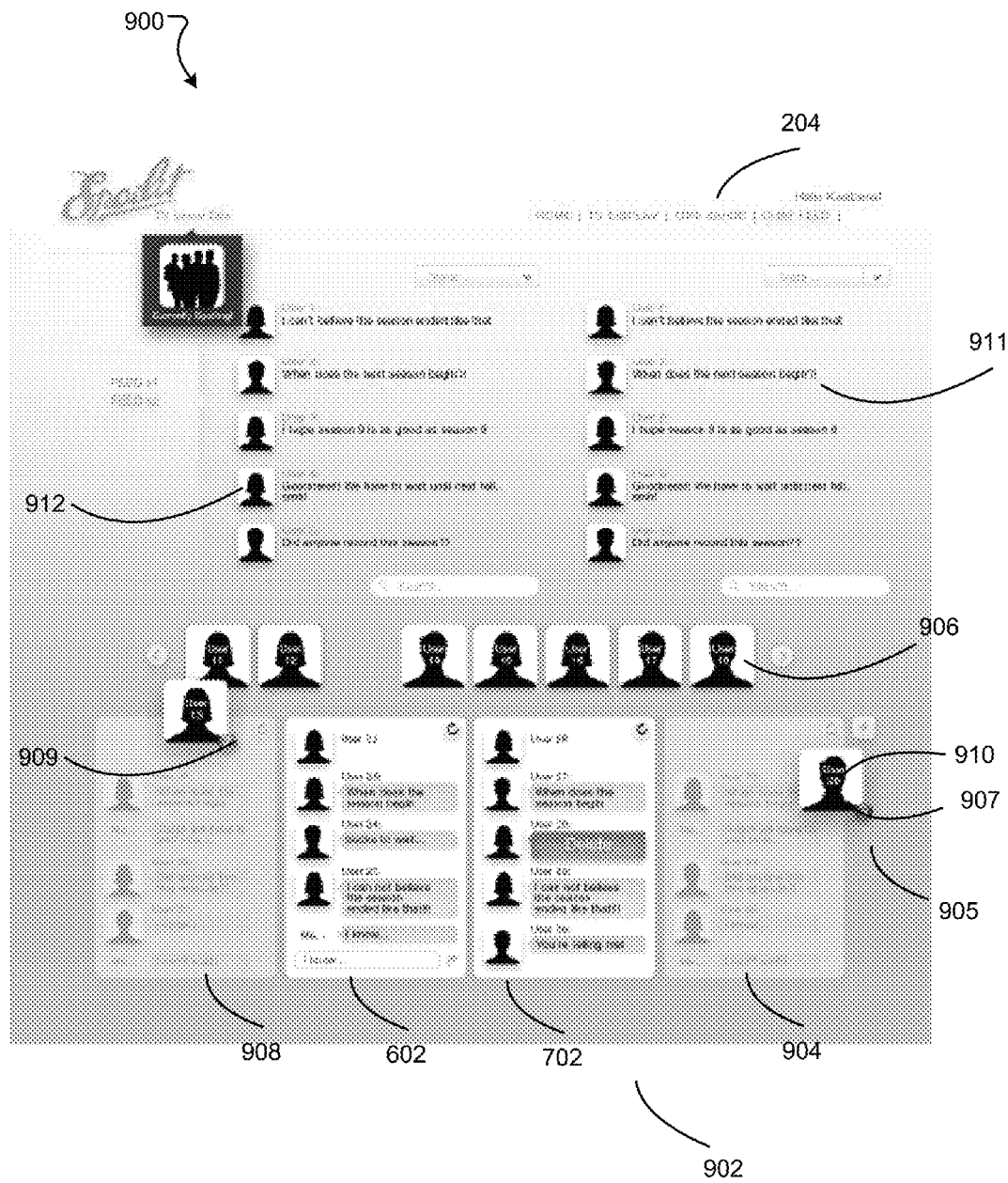
FIG. 9 is a block diagram of an example page for viewing audio-video content, which shows multiple chats and chat feeds in the context of a two-screen experience.

FIG. 9 shows a portal, e.g., Web page 900, which may be implemented in a two-screen implementation of the example system. That is, the viewable program is not displayed on the same screen as representations of user objects, but rather is displayed on a second screen (e.g., a television screen, which is not shown). In the example of FIG. 9, five chat cards 902 are shown. Chat cards 602, 702 are the same as those shown in FIG. 8. Chat card 904 is displayed as well in shadow view because it has been selected for movement from sub-view area 905 to sub-view area 906. Accordingly, chat card 905 is displayed in shadow view, with a "−" sign 907 to indicate that it is being removed from the chat deck (whereas chat card 908 has a "+" sign 909 to indicate that it is being added to chat deck). Chat card 904 remains displayed in shadow form until it is dragged-and-dropped to sub-view area 906. Computer-executable code in sub-view area 906 interacts with computer-executable code associated with the data object represented by object element 910 to re-compress (e.g., reserialize) data into the data object represented by the object element, leaving only the object element (e.g., the representation, such as the user's profile picture) displayed in sub-view area 906, with no corresponding chat card.

FIG. 9 also shows different chat feeds 911, 912 relating to programs that are currently being viewed in the system. These chat feeds may be user-selected, and may be based on users preferences or other information input by the user. The user may configure, and display, the portal of Web page 900 by selecting the "CHAT FEED" menu option from menu 204.

Accordingly, as described above, in some implementations, the user may manage and view different object elements simultaneously by, e.g.: (1) moving object elements back and forth between first and second sub-views, while at the same time (2) interacting with, or viewing, multiple object elements in a given sub-view (e.g., sharing and viewing data with multiple users in the hot space simultaneously); and (3) scrolling through the object elements in each view. Content may be managed between the compression space (e.g., sub-view area 906 of FIG. 9) and the decompression space (e.g., sub-view area 905 of FIG. 9) through use of a hand, finger, cursor, track pad, mouse, or equivalent tactile gestures and/or apparatus, or through automated processes (e.g. computer programs) configured to move one or more object elements to a given sub-view. The user may use a pinch, a click, tap, or series of taps or gestures on one or more of the object element(s) in a sub-view to move one or more object elements into a grouping sub-view that dynamically adjusts to include the new element.

In the example implementations described above, the systems include a dynamic communications portal (e.g., a Web page or other type of interactive user interface) that encourages users to interact, and to view the reactions of their neighbors, while watching broadcast television or other audio-video content. In some implementations, the portal provides users with an opportunity to view the profile pictures of people who are watching a broadcast television show at a given time, and then to select said users for a chat experience.

The example systems described herein may combine functions of (1) drag-and-drop technology, (2) sub-views and data objects associated with a display interface, which are associated with executable event-trigger code, (3) embedding/associating extractable data with(in) data objects, and (4) compressing and decompressing data embedded/associated with (in) data objects upon moving representations associated with the data objects (e.g., the object elements) into a sub-view containing executable event trigger code configured to either compress (e.g., serialize) or decompress (e.g., deserialize) data.

The example systems described herein include various intelligently-coded sub-views that are resident on a display screen, or the functional equivalent of a display screen. The sub-views may be coded in a manner that causes various data object to dynamically expand visible data, contract visible data, reveal hidden/embedded data, and/or hide visible data elements from view as a user moves or drags a representation of the data object from one specially-coded sub-view to another specially-coded sub-view. The executable code associated with the sub-views is referred to herein as "event trigger coding," and variations of that phrase, such as event coding, event trigger(s), and trigger(s).

In some implementations, each sub-view, and corresponding data object representation may be programmed or coded to cause or trigger any one or more of the following functions in response to a user applying a pinch, click, dragging gesture, and/or mouse movement to move an object element from one sub-view into another sub-view: hiding, embedding, compressing, decompressing, expanding, contracting, or revealing data elements that are contained in, or related to, the data objects whose representation is moved into the sub-view.

As shown in FIGS. 2 to 9 above, a viewable display on a laptop, personal digital assistant (PDA), mobile phone, television, or tablet device may be divided into two or more sub-views. The first sub-view (e.g., sub-view area 906) may contain object elements such as profile pictures (e.g., a profile-picture-object element). The profile-picture-object element may contain, or be associated with, one or more embedded, hidden, or compressed data objects that are related to the person in the profile picture (e.g., object-element data). That is, in some implementations, a single object element (e.g., profile picture) may be associated with multiple data objects, each representing different information and each behaving in the manner described herein. Both the first sub-view, and the object element(s) may be associated with distinct, executable event-trigger code that cause the object-element data to remain compressed or embedded so long as the object element(s) remain inside of the first sub-view on the viewable display. The second sub-view (e.g., sub-view area 905) may contains additional executable code that causes or triggers the profile-picture-object element(s) to reveal expanded or decompressed object-element data about the person or subject featured in the profile-picture-object element when the object element is moved by the user from the first sub-view to the second sub-view. The expanded object-element data may include that person's biographical information and micro-blogging activity, among other information or related data. The coding language(s) and protocols that may be used to perform these functions include, but are not limited to, JSON (JavaScript® Object Notation), Javascript®, HTML (HyperText Markup Language), or CSS (Cascading Style Sheets).

In some implementations, the object elements in each sub-view may move or shift slightly to the right and to the left to accommodate the action of the user placing a new object element into the second sub-view for data expansion, or back to the first sub-view for data decompression or re-compression. In addition, the object elements in each sub-view may be programmed to be scrollable menus of object elements that may be simultaneously viewed, manipulated, and interacted therewith. A scroll bar for scrolling through object elements is shown in the figures. Also, an object element that is moved from the first sub-view to the second sub-view is typically no longer displayed in the first sub-view, and vice versa.

In some implementations, users may: view and dynamically scroll through a list of profile pictures of social-media users in the first sub-view, and drag the profile picture(s) into the second sub-view (e.g., a hot space). The hot space (e.g., via code in, e.g., JSON, CSS, Javascript®, and/or HTML) interacts with code associated with the profile-picture-object element(s) and/or corresponding data object(s) to trigger the automatic revelation of expanded or decompressed information regarding the person featured in the profile-picture-object element. Such information may include, e.g., the profiled person's micro-blogging activity and interactions. In some implementations, the hot space is a key that unlocks or expands data that is embedded, hidden, compressed or catalogued, within the object element that is dragged from the first sub-view into the hot space.

In an example implementation, the profile-picture-object elements in the first sub-view are images of people who are all watching the same television broadcast or on-demand video at roughly the same time. In some implementations, the profile-picture-object elements may include only those users with whom the user has a pre-established connection within the system or in an external network.

In some example implementations, profile-picture-object elements may be initially located in the first sub-view, which is positioned at or near the middle of the display screen (e.g., sub-view area 906 of FIG. 9), and which includes a left-to-right-scrollable menu or collage of profile-picture object elements that may be dragged and dropped to the second sub-view in lower half of the screen (e.g., sub-view area 905 of Fig.). When a picture is dragged to the second sub-view in the lower half of the screen, the picture object may be automatically converted (as described herein) into an interface element, such as a chat window, where the user can now chat with the person pictured and view a stream of information about the person pictured, including, e.g., additional pictures of the profiled person and that person's current or previous micro-blogging activity with other social-network users. When a profile-picture-object element is dragged back to the first sub-view area (e.g., from sub-view area 905 to sub-view area 906 of FIG. 9), then the respective event coding associated with the first sub-view and the profile-picture object element(s) will interact to hide, embed, or compress (e.g., serialize), the micro-blogging activity.

In some implementations, hyperlinked news headlines with associated event code may be located in a sub-view at or near the top of the display screen. In some implementations, the sub-view(s) may include a list of available news headlines that may be dragged to a second sub-view as well. When a headline is dragged or clicked to the second sub-view, the headline object element may then be automatically converted to a full news article, e.g., via the interaction between event code contained in a data object represented by the headline (in this example, the object element) and the event code in second sub-view. Next, when the user drags or clicks the article back to the first sub-view, the article text will hide, and only the headline text(s) will remain in the first sub-view, e.g., via the interaction between the event codes contained in the headline and the first sub-view.

Figure 10:
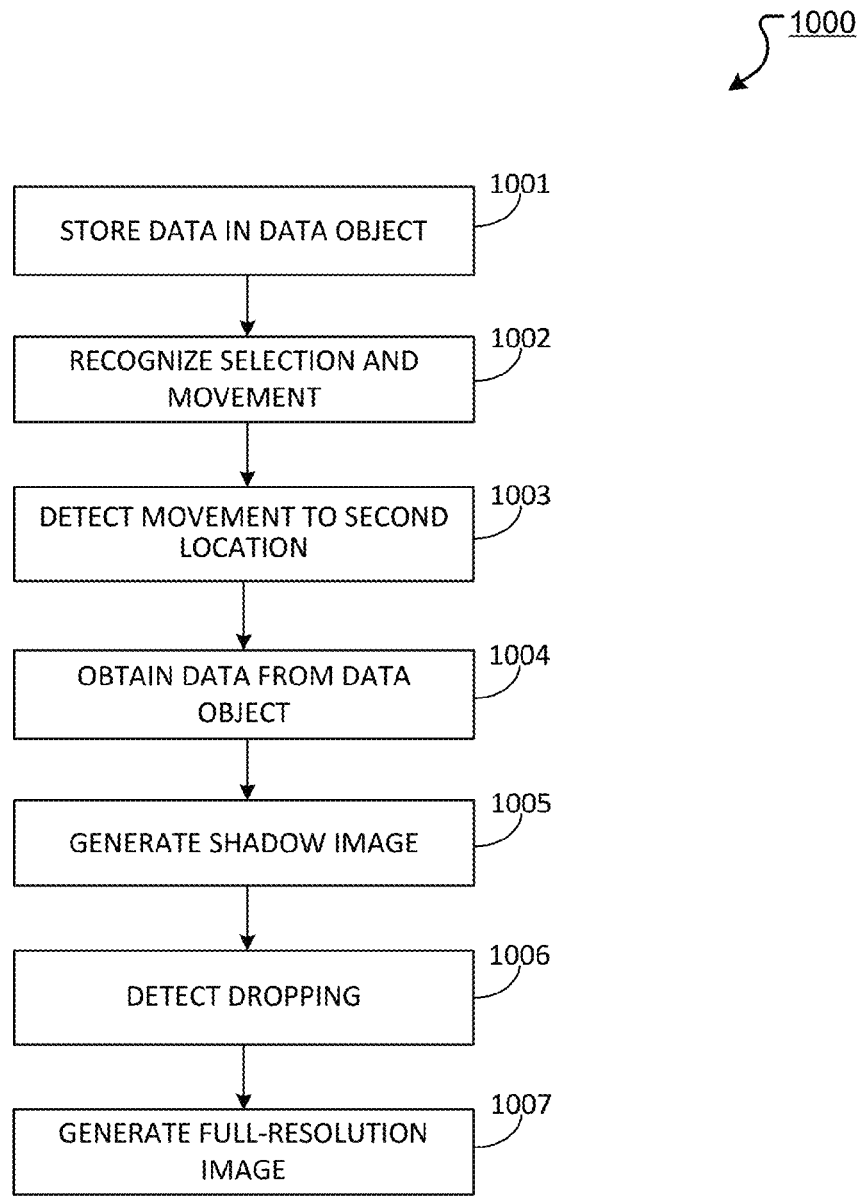
FIG. 10 is a flowchart showing an example process for enabling communication and content viewing.

FIG. 10 is a flowchart showing an example process 1000 for implementing the system described herein for enabling communication and content viewing. Executable instructions for implementing example process 1000 may be stored on one or more non-transitory machine-readable storage media or devices. Example process 1000 may be implemented by one or more processing devices on a user device (e.g., 104, 105, 106, 107) and/or a server (e.g., 101) by retrieving and executing the instruction to perform the following operations.

According to process 1000, data for various users is stored (1001) in data objects. In some implementations, the data corresponds to electronic communication, such as chat sessions, for a corresponding user. The data may also include profile information for that user including, but not limited to, the profile information described herein. The data object may be a JSON object and the data contained therein may be serialized. Each data object is associated with executable code (e.g., event trigger code) that operates, either alone or in conjunction with other executable code, to perform the functions described herein. The executable code may be stored in the data object, or elsewhere and associated with the data object and the corresponding object element (each data object may be associated with, and represented by, an object element). Examples of object elements include, but are not limited to, those described herein. The object elements are rendered, and displayed in a first sub-view area of a portal (e.g., a Web page), as described above.

Process 1000 recognizes (1002) selection and movement of an object element from a first location (e.g., a first sub-view area 906) to a second location (e.g., a second sub-view area 905) on the portal, which is different from the first location. In this regard, executable code is associated with the data object at the first location. The code is executed in response to detection that the object has been selected (e.g., clicked-on). The code, when executed, generates a temporary container object, in which the data object is stored for "transport" from the first location to the second location. The code, when executed, also redraws the part of the first location that included the object element corresponding to the data object to reflect that the object element has been removed, and continues to redraw the object element on-screen to reflect movement from the first location to the second location.

If the object element does not reach the second location, e.g., it is dropped prior to reaching the second location, code associated with the data object informs a process associated with the first location (which may be implemented by executable code associated with the first location) that there is data from the object that will be transferred to the process. Thereafter, the data is transferred to the process, the process removes the container object, stores the data object in an appropriate location, and redraws the corresponding object element in the first location.

If the object element reaches the second location, process 1000 detects (1003) that the object element has been moved to the second location. In some implementations, reaching the second location may be detected based on an interaction between code executing for the data object and code executing at the second location. Detection may be performed, e.g., by detecting that the object element (e.g., the profile picture) corresponding to the data object has reached a particular part of the display screen. In response to this detection, process 1000 triggers (1004) execution of a function to obtain the data from the corresponding data object. For example data from the data object may be extracted and deserialized. Before the object element is dropped at the second location, process 1000 generates (1005), and renders on-screen at the second location, a shadow image that is based on the data object. For example, the shadow image may be a less-than-full resolution image of the electronic communication (e.g., a chat session) represented by data in the data object. This shadow image is rendered on-screen. An example of a shadow image is, e.g., chat card 908 of FIG. 9.

Process 100 detects (1006) that the object element has been dropped at the second location. This may be done, e.g., by detecting release of a mouse button or other control feature when the object element is determined to be at the second location. In response, process 1000 generates (1007) a full-resolution display image of electronic communication (e.g., a chat session) represented by data in the data object. This full-resolution image is rendered on-screen. An example of a full-resolution image is, e.g., chat card 602 of FIG. 9. As shown in, e.g., FIG. 9, the image (e.g., the chat card) is rendered over at least part of the second location. In other implementations, the image may be rendered elsewhere on-screen, or some other function may be triggered unrelated to image rendering.

As described above, in this example implementation, the interaction of event trigger code associated with the data object and the second location (e.g., sub-view) triggers deserialization of data representing an electronic communication, and display thereof. In some implementations, the data in the data object may be encrypted or stored in a manner that is not serialized. In such implementations, event trigger code associated with the data object and the second location (e.g., sub-view) may trigger decryption of the data and/or any other appropriate type of expansion and display of the data. In some implementations, as described above, the data may represent information other than electronic communications. For example, the data may represent articles or other text, which may be expanded and viewed in the manner described herein. In some implementations, the data may represented one or more pointers to locations containing data representing electronic communications or other information. Those pointers may be deserialized or otherwise accessed and used to obtain the data that is used to generate the displays (chat cards) described herein.

As explained above, a data object may be moved (e.g., by moving its corresponding object element, such as a profile picture) from the second location (e.g., sub-view 905) to the first location (e.g., sub-view 906) to "close" viewing of a chat session. In this case, process 1000 is effectively reversed. For example, code executing in the second location and code associated with the data object detects selection and movement of an object element corresponding data object. In that case, a process is triggered that serializes data from the second location, and stores that data in the data object, which itself is stored in a temporary container object for transport to the first location. Appropriate processes are executed to redraw the part of the second location previously containing the object element, and to draw the object element during motion. The object element is then dropped to the first location, where the data object is removed from the temporary container object and stored in an appropriate location. The object element is then redrawn on-screen at an appropriate area of the first location.

All or part of the processes described herein and their various modifications (hereinafter referred to as "the processes") can be implemented, at least in part, via a computer program product, i.e., a computer program tangibly embodied in one or more information carriers, e.g., in one or more tangible machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semi-conductor storage area devices, e.g., EPROM, EEPROM, and flash storage area devices; magnetic disks, e.g., internal hard disks or removable disks; magneto-optical disks; and CD-ROM and DVD-ROM disks.

Each computing device, such as a tablet computer, may include a hard drive for storing data and computer programs, and a processing device (e.g., a microprocessor) and memory (e.g., RAM) for executing computer programs. Each computing device may include an image capture device, such as a still camera or video camera. The image capture device may be built-in or simply accessible to the computing device.

Each computing device may include a graphics system, including a display screen. A display screen, such as an LCD or a CRT (Cathode Ray Tube) displays, to a user, images that are generated by the graphics system of the computing device. As is well known, display on a computer display (e.g., a monitor) physically transforms the computer display. For example, if the computer display is LCD-based, the orientation of liquid crystals can be changed by the application of biasing voltages in a physical transformation that is visually apparent to the user. As another example, if the computer display is a CRT, the state of a fluorescent screen can be changed by the impact of electrons in a physical transformation that is also visually apparent. Each display screen may be touch-sensitive, allowing a user to enter information onto the display screen via a virtual keyboard. On some computing devices, such as a desktop or smartphone, a physical QWERTY keyboard and scroll wheel may be provided for entering information onto the display screen. Each computing device, and computer programs executed thereon, may also be configured to accept voice commands, and to perform functions in response to such commands. For example, the process described herein may be initiated at a client, to the extent possible, via voice commands.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Any features described herein may be combined with features described in U.S. patent application Ser. No. 14/339,694, filed concurrently herewith and entitled "Displaying Information Based On Recognition Of A Subject", the contents of which are incorporated herein by reference.

Other implementations not specifically described herein are also within the scope of the following claims.

What is claimed is:

1. A method comprising:
   storing, in a data object, data corresponding to electronic communication, the data object having an object element associated therewith, the object element initially residing on a first location of a portal displayed on a display screen of a computing device, the object element comprising an image representing a first user associated with the electronic communication, the electronic communication comprising a chat session in which the first user will participate;
   recognizing, by a processing device, movement of the object element from the first location to a second location on the portal displayed on the display screen of the computing device, the second location being different from the first location;
   detecting, by the processing device, that the object element has been moved to the second location;
   in response to detecting that the object element has been moved to the second location, the processing device triggering execution of a function to obtain the data from the data object, wherein obtaining the data comprises extracting data embedded in the data object;
   generating, by the processing device, a display of the electronic communication based on the data obtained from the data object, the display being rendered over at least part of the second location, the display accepting a contribution to the electronic communication from a second user who is associated with the computing device;
   recognizing, by the processing device, movement of the object element from the second location to the first location on the portal;
   detecting, by the processing device, that the object element has been moved to the first location; and
   in response to detecting that the object element has been moved to the first location, the processing device triggering execution of a function to store, in the data object, data representing the electronic communication including the contribution by the second user.

2. The method of claim 1, wherein the data comprises a serialized representation of the electronic communication, and the function to obtain the data comprises a process for deserializing the data.

3. The method of claim 1, wherein the data comprises one or more pointers to information about the electronic communication, and the function to obtain the data comprises using the pointer to retrieve the data.

4. The method of claim 1, further comprising:
   in response to recognizing that the object element moved from the first location, the processing device storing the data object in a temporary object; and
   redrawing, by the processing device, a part of the first location that contained the object element to reflect movement of the object element from the first location.

5. The method of claim 1, wherein the display of the electronic communication is generated in response to detecting release of the object element at the second location; and
   wherein the method further comprises generating, by the processing device, a shadow display in response to detecting that the object element is over the second location but has not been released over the second location, the shadow display being generated based on at least some of the data.

6. The method of claim 1, further comprising, prior to detecting that the object element has been moved to the second location:
   detecting, by the processing device, that the object element has been released prior to reaching the second location;
   sending, by the processing device, the data object to a process associated with the first location; and
   executing, by the processing device, the process at the first location to redraw the object element at the first location and to store the data object in the first location in association with the object element.

7. The method of claim 1, wherein the data comprises an encrypted representation of the electronic communication, and the function to obtain the data comprises a process for decrypting the data.

8. The method of claim 1, wherein the chat session is for a user of a multimedia application, the multimedia application for displaying audio-video content associated with the chat session either on the portal or on a second portal.

9. The method of claim 1, wherein the data object stores data representing content other than the electronic communication, the display including the content other than the electronic communication.

10. A non-transitory machine-readable storage medium storing instructions that are executable by one or more processing devices to perform operations comprising:
    storing, in a data object, data corresponding to electronic communication, the data object having an object element associated therewith, the object element initially residing on a first location of a portal displayed on a display screen of a computing device, the object element comprising an image representing a first user associated with the electronic communication, the electronic communication comprising a chat session in which the first user will participate;
    recognizing movement of the object element from the first location to a second location on the portal displayed on the display screen of the computing device, the second location being different from the first location;
    detecting that the object element has been moved to the second location;
    in response to detecting that the object element has been moved to the second location, triggering execution of a function to obtain the data from the data object, wherein obtaining the data comprises extracting data embedded in the data object;
    generating a display of the electronic communication based on the data obtained from the data object, the display being rendered over at least part of the second location, the display accepting a contribution to the electronic communication from a second user who is associated with the computing device;
    recognizing movement of the object element from the second location to the first location on the portal;
    detecting that the object element has been moved to the first location; and
    in response to detecting that the object element has been moved to the first location, triggering execution of a function to store, in the data object, data representing the electronic communication including the contribution by the second user.

11. The non-transitory machine-readable storage medium of claim 10, wherein the data comprises a serialized representation of the electronic communication, and the function to obtain the data comprises a process for deserializing the data.

12. The non-transitory machine-readable storage medium of claim 10, wherein the data comprises one or more pointers to information about the electronic communication, and the function to obtain the data comprises using the pointer to retrieve the data.

13. The non-transitory machine-readable storage medium of claim 10, wherein the operations comprise:
    in response to recognizing that the object element moved from the first location, storing the data object in a temporary object; and
    redrawing a part of the first location that contained the object element to reflect movement of the object element from the first location.

14. The non-transitory machine-readable storage medium of claim 10, wherein the display of the electronic communication is generated in response to detecting release of the object element at the second location; and
    wherein the operations comprise generating a shadow display in response to detecting that the object element is over the second location but has not been released over the second location, the shadow display being generated based on at least some of the data.

15. The non-transitory machine-readable storage medium of claim 10, wherein the operations further comprise, prior to detecting that the object element has been moved to the second location:
    detecting that the object element has been released prior to reaching the second location;
    sending the data object to a process associated with the first location; and
    executing the process at the first location to redraw the object element at the first location and to store the data object in the first location in association with the object element.

16. The non-transitory machine-readable storage medium of claim 10, wherein the data comprises an encrypted representation of the electronic communication, and the function to obtain the data comprises a process for decrypting the data.

17. The non-transitory machine-readable storage medium of claim 10, wherein the chat session is for a user of a multimedia application, the multimedia application for displaying audio-video content associated with the chat session either on the portal or on a second portal.

18. A system comprising:
    computer storage storing instructions that are executable; and
    a processing device to execute the instructions to perform operations comprising:
        storing, in a data object, data corresponding to electronic communication, the data object having an object element associated therewith, the object element initially residing on a first location of a portal displayed on a display screen of a computing device, the object element comprising an image representing a first user associated with the electronic communication, the electronic communication comprising a chat session in which the first user will participate;
        recognizing movement of the object element from the first location to a second location on the portal displayed on the display screen of the computing device, the second location being different from the first location;
        detecting that the object element has been moved to the second location;
        in response to detecting that the object element has been moved to the second location, triggering execution of a function to obtain the data from the data object, wherein obtaining the data comprises extracting data embedded in the data object;
        generating a display of the electronic communication based on the data obtained from the data object, the display being rendered over at least part of the second location, the display accepting a contribution to the electronic communication from a second user who is associated with the computing device;
        recognizing movement of the object element from the second location to the first location on the portal;
        detecting that the object element has been moved to the first location; and
        in response to detecting that the object element has been moved to the first location, triggering execution of a function to store, in the data object, data representing the electronic communication including the contribution by the second user.

19. The system of claim 18, wherein the operations comprise:
 in response to recognizing that the object element moved from the first location, the processing device storing the data object in a temporary object; and
 redrawing, by the processing device, a part of the first location that contained the object element to reflect movement of the object element from the first location.

20. The method of claim 18, wherein the display of the electronic communication is generated in response to detecting release of the object element at the second location; and
 wherein the operations comprise generating a shadow display in response to detecting that the object element is over the second location but has not been released over the second location, the shadow display being generated based on at least some of the data.

* * * * *